United States Patent Office 3,770,832
Patented Nov. 6, 1973

3,770,832
AROMATIC SULPHONES
Victor Jeffrey Leslie, Potters Bar, and John Brewster Rose, Letchworth, England, assignors to Imperial Chemical Industries Limited, London, England
No Drawing. Filed July 17, 1970, Ser. No. 55,980
Claims priority, application Great Britain, July 31, 1969, 38,437/69; Mar. 19, 1970, 13,354/70
Int. Cl. C07c *147/06*
U.S. Cl. 260—607 A      7 Claims

ABSTRACT OF THE DISCLOSURE

New aromatic sulphones of the formula

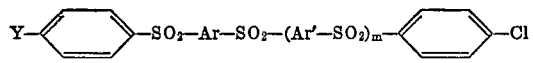

where Y is fluorine or hydroxy, $m$ is zero or one and each of Ar and Ar' is a bivalent aromatic radical, and (where Y is hydroxy) the alkali metal salts thereof, are valuable intermediates for the preparation of aromatic polymers. The alkali metal salts are readily polymerised, or co-polymerised with an alkali metal salt of 4-(4-chlorophenyl-sulphonyl) phenol, as described in British specification 1,153,035. The bivalent aromatic radicals Ar and Ar' are such that H—Ar—H or H—Ar'—H contains two hydrogen atoms which can readily be replaced by reaction with sulphonyl chlorides under Friedel-Crafts conditions in two distinct stages. In particular, Ar and Ar' may have the structure

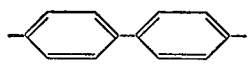

This invention relates to new aromatic sulphones which may be used as intermediates for the production of aromatic polymers.

In British specification 1,153,035, there is described and claimed a method for the production of aromatic polymers whose molecular chains comprise units of the formula

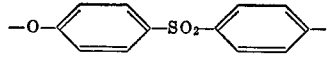

in which an alkali metal salt of a 4-(4-halophenylsulphonyl) phenol is polymerised by the displacement of alkali metal halide. This monomer is obtained by the reaction of a bis-(4-halophenyl) sulphone with a substantially equivalent amount of alkali metal hydroxide.

According to the present invention, there are provided new aromatic sulphones of the formula

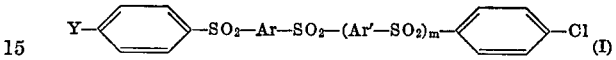

where Y is fluorine or hydroxy, $m$ is zero or one, and each of Ar and Ar' is a bivalent aromatic radical as hereinafter defined, and (when Y is hydroxy) the alkali metal salts thereof.

The compounds in which Y is fluorine possess two reactive halogen atoms of differing reactivities, and under alkaline conditions the fluorine atom is rapidly replaced by a hydroxy group. The compounds of the invention therefore possess a reactive chlorine atom as well as a reactive fluorine atom or phenolic group, and can serve as valuable chemical intermediates for producing a variety of products. The alkali metal salts of the compounds where Y is hydroxy can be polymerised or co-polymerised to give aromatic polymers having valuable physical properties.

The bivalent aromatic radicals Ar and Ar' in the compounds of the invention are such that the compounds H—Ar—H and H—Ar'—H contain two hydrogen atoms that are capable of replacement by reaction with an aromatic sulphonyl chloride under Friedel-Crafts conditions in two distinct stages; i.e. the structure of Ar or Ar' is such that replacement of the first H by an aryl sulphonyl group reduces the reactivity of the second H. For example, each of Ar and Ar' may have any of the structures shown below.

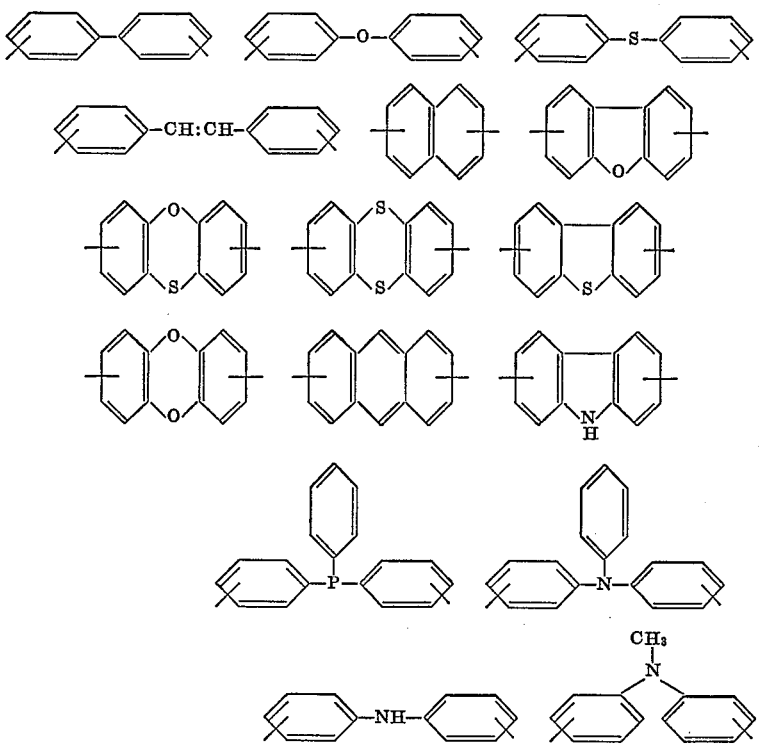

The compounds of the present invention where Y is fluorine may be prepared by methods analogous to those already known for the preparation of asymmetrical aromatic sulphones. In general such methods consist in reacting a compound of the formula A—SO₂—X (where X is halogen atom, preferably chlorine, or a hydroxy group) with a compound of the formula H—B under conditions in which XH (i.e. a hydrohalogen acid or water) is eliminated, to form a compound A—SO₂—B. Comparing this formula with Formula I, it is clear that A and B can be the residues on either side of any of the sulphone groups present; that is to say, more specifically, A and B can be appropriately selected from the groups

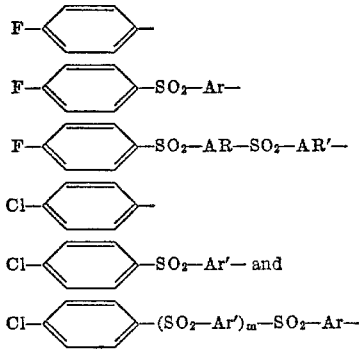

Where X is a halogen atom, the reaction can occur under Friedel-Crafts conditions, that is in the presence of ferric chloride or any of the many other catalysts well known to promote this type of reaction.

Where X is a hydroxy group, water may be eliminated in certain cases by heating but more usually a condensing agent such as phosphorus pentoxide or a pentavalent phosphorus halide may be required (see U.S. patent specification No. 3,125,604, the content of which is herein incorporated by reference). Alternatively, the compound H—B as defined above may be reacted with the compound A—SO₂—OH in the presence of methyl pyrosulphate according to the method described in British patent specification No. 895,464.

The compounds of the formula

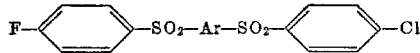

may be produced from a compound of formula H—Ar—H by successive reaction with 4-chlorobenzenesulphonyl chloride and 4-fluorobenzenesulphonyl chloride, either in that order or in the reverse order. However, 4-fluorobenzenesulphonyl chloride is very much less readily available than 4-chlorobenzenesulphonyl chloride, and for economic reasons the following procedure is preferred:

(a) Reaction of 4-chlorobenzenesulphony chloride with H—Ar—H to give a compound of formula

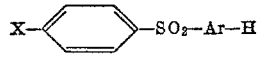

where X is chlorine;

(b) Reaction of the above compound with an alkali metal fluoride to give a compound of the same formula in which X is fluorine;

(c) Reaction of the latter compound with 4-chlorobenzenesulphonyl chloride to give a compound of the invention in which Y is fluorine.

Similarly the compounds of the formula

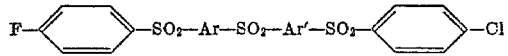

may be made by the reaction of the compound

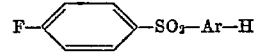

(prepared as described above) with a sulphonyl chloride of the formula

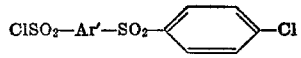

This sulphonyl chloride may be made by the reaction of 4-chlorobenzenesulphonyl chloride with H—Ar′—H to give a compound of formula

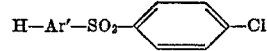

and treatment of the latter with chlorosulphonic acid.

Alternatively it is possible (though generally rather less convenient) to make the sulphonyl chloride

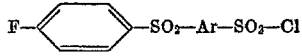

in analogous manner by reacting a compound of formula

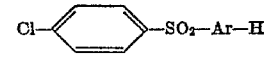

with an alkali metal fluoride to replace Cl by F before making the sulphonyl chloride with chlorosulphonic acid; this sulphonyl chloride is then reacted with a compound of formula

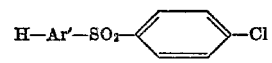

to give the desired compound of the invention.

In summary, therefore, compounds of the invention having the formula

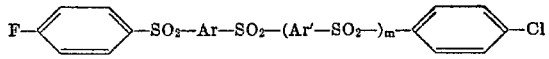

may be made by the reaction together of compounds of the formulae

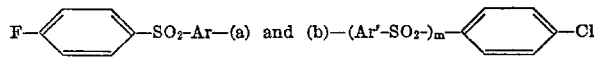

where one of the reactive groups (a) and (b) is H and the other is ClSO₂, (a) preferably being H and (b) ClSO₂.

Treatment with an alkali metal hydroxide rapidly converts the last compound into a compound of the invention in which Y is hydroxy, or an alkali metal salt thereof.

The alkali metal salt is initially obtained dissolved in the reaction medium and may be used directly for polymerisation, although for the purpose of purification it may be more convenient in some cases to acidify and then isolate the compound of the invention in which Y is a free hydroxy group. This can be converted back into an alkali metal salt by treatment with a suitable base (e.g. an alkali metal hydroxide or alkoxide).

The alkali metal is conveniently potassium or sodium. Displacement of alkali metal halide in polymerisation, or in the exchange of chlorine for fluorine, often occurs more readily if the potassium cation is present in the reagent used, but the weight (and usually the price) per mole of a potassium compound is higher than the corresponding sodium compound. Some or all of the alkali metal cation in the reagent may be replaced by an organic onium cation having a positively charged hetero-atom (for example a quaternary ammonium cation such as tetramethylammonium) stable under the conditions of the reaction, and the term "alkali metal" as used herein is deemed to refer also to such onium cations.

The alkali metal salts of the compounds of the invention in which Y is hydroxy, and mixtures of compounds of the invention in which Y is fluorine with a substantially equivalent amount of an alkali metal hydroxide, may be polymerised by the methods described in British specification 1,153,035 to give polymers containing units of the structure

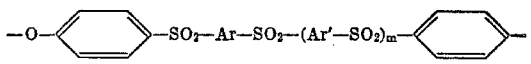

They may be polymerised alone, they may be copolymerised with each other (where m, Ar, or Ar' are different in the different monomers), or they may be copolymerised with alkali metal salts of other halophenols, and in particular with alkali metal salts of 4-(4-halophenylsulphonyl) phenols as described in British specification 1,153,035 or with mixtures of alkali metal salts of dihydric phenols and activated dihalobenzenoid compounds as described in British specification 1,078,234. The compounds of the invention in which Y is fluorine may likewise be mixed with the activated dihalobenzenoid compounds to form polymers by reaction with an alkali metal hydroxide (as described in British specification 1,153,035) or with an alkali metal salt of a dihydric phenol (as described in British specification 1,078,234).

Polymers of particular interest are obtained from compounds of the invention in which the bivalent aromatic radicals Ar and Ar' have the structure

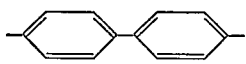

For example, 4-(4-chlorophenylsulphonyl)-4'-(4-fluorophenylsulphonyl)-biphenyl on treatment with potassium hydroxide gives the potassium salt of 4-(4-chlorophenylsulphonyl) - 4' - (4 - hydroxyphenylsulphonyl)-biphenyl which polymerises to give a regular linear polymer having repeating units of the structure

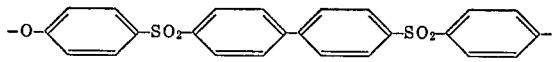

and a softening point about 60 deg. C. higher than that of the polymer having repeating units of the formula

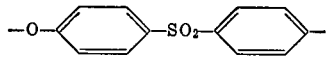

Copolymerisation with the potassium salt of 4-(4-chlorophenylsulphonyl) phenol gives a series of copolymers having intermediate physical properties which may be tailored to suit the intended use for the polymer. These polymers may be regarded as polyaryl sulphones in which the aryl residues are derived from biphenyl and diphenyl ether (up to 50 mole percent of the former).

Similarly, the potassium salt of 4-(4'-4''-chlorophenylsulphonylbiphenylyl)sulphonyl-4'-(4 - hydroxyphenylsulphonyl)biphenyl may be prepared and polymerises to give a polymer having repeating units of the structure

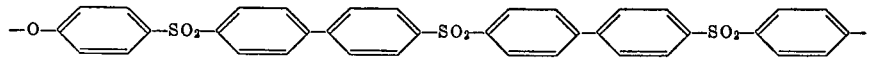

and an even higher softening point. This is a polyaryl sulphone having 66.7 mole percent of biphenyl and 33.3 mole percent of diphenyl ether units. Copolymerisation with the potassium salt of 4-(4-chlorophenylsulphonyl) phenol or of 4-(4-chlorophenylsulphenyl)4'-(4-hydroxyphenylsulphonyl)biphenyl gives series of copolymers having a smaller proportion of biphenyl units and intermediate properties.

Such polyaryl sulphones were originally described and claimed in British specification 1,016,245 together with a variety of ways of using them.

The following examples illustrate the invention.

EXAMPLE 1

A mixture of biphenyl (308 g.; 2.0 moles) and 4-chlorobenzenesulphonyl chloride (422 g.; 2.0 moles) was dissolved in redistilled nitrobenzene (500 cm.³) and the solution was stirred under an atmosphere of nitrogen and heated to 110° C. Anhydrous ferric chloride (4 g.) was added and stirring was continued, while the mixture was kept at 110° C., until the evolution of hydrogen chloride subsided.

The dark-coloured solution was then poured into methanol (2 litres) and the precipitate was filtered off, washed twice with a solution of acetylacetone (5 cm.³) in methanol (500 cm.³), and after a final wash with methanol was air-dried. The yield was 524 g. (80%) of a product of M.P. 167–168° C. Recrystallisation from acetic acid (with charcoal) gave pure white needles of 4-chlorophenylsulphonylbiphenyl, M.P. 171–173° C. The elemental analysis, and the infra-red and nuclear magnetic resonance spectra of this product were consistent with this structure

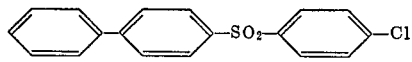

A mixture of 4-chlorophenylsulphonylbiphenyl (164.2 g.; 0.5 mole) and redistilled 4-fluorobenzenesulphonyl chloride (B.P. 88° C. at 2.5 torr) (105 g.; 0.54 mole) was dissolved in nitrobenzene (350 cm.³) and the solution was warmed to 110° C. Anhydrous ferric chloride (2 g.) was added and stirring was continued at 110° C. until hydrogen chloride ceased to be evolved. The dark-coloured viscous mass was poured into methanol (1 litre) and the precipitate was filtered off. It was washed with a solution of acetylacetone (3 cm.³) in methanol (300 cm.³) and then with methanol (300 cm.³), and was then dried. Recrystallisation from acetic acid( with charcoal) afforded long colourless needles of 4-(4-chlorophenylsulphonyl)-4'-(4 - fluorophenylsulphonyl)biphenyl. The yield was 162.5 g. (68%) of a product of M.P. 237–238° C. The infra-red and nuclear magnetic resonance spectra and the elemental analysis of this product were consistent with the structure

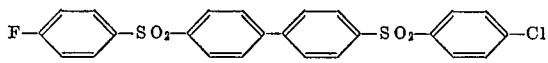

4-(4-chlorophenylsulphonyl) - 4' - (4 - fluorophenylsulphonyl) biphenyl (48.65 g.; 0.1 mole) was dissolved in dimethyl sulphoxide (510 cm.³) by heating the stirred mixture to 110° C. in a stainless steel vessel and under a nitrogen atmosphere. To this was added a solution of potassium hydroxide in water (23.22 g. of solution; 0.2 mole KOH), and the mixture was vigorously stirred. The temperature of the mixture was gradually raised over 5.5 hours to 125° C. The cooled mixture was poured into dilute hydrochloric acid (2 litres), and the white precipitate was filtered off and washed several times with water. The material was recrystallised from acetic acid to give colourless needles of 4-(4-chlorophenylsulphonyl) - 4' - (4 - hydroxyphenylsulphonyl)biphenyl, M.P. 235–238° C. The infra-red and nuclear magnetic resonance spectra were consistent with the structure

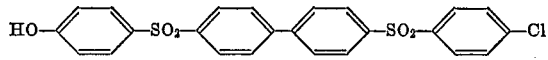

4 - (4 - chlorophenylsulphonyl) - 4' - (4 - hydroxyphenylsulphonyl) biphenyl (5 g.) was suspended in methanol (100 cm.³) and a methanolic solution of potassium hydroxide was added (10 cm.³ of a 1.04 N solution). The mixture was agitated for 30 minutes and the solvents were slowly removed under reduced pressure to give the potassium salt of formula

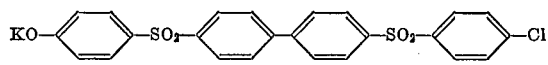

as a yellow solid.

This salt was dried under vacuum at a temperature of 125° C. for 18 hours, and was then polymerised in the melt at 310° C. for 1 hour. The polymer was worked up by dissolving the products from the polymerisation in N,N-dimethylformamide and precipitating the polymer by pouring the solution into water. The polymer had a reduced viscosity of 0.7, measured on a solution in N,N-dimethylformamide (containing 1 g. of polymer in 100 cm.³ of solution) at 25° C., and it had a glass transition point of 279° C., measured by differential scanning calorimetry. Its infra-red and nuclear magnetic resonance spectra were consistent with a polymer consisting essentially of repeating units having the structure

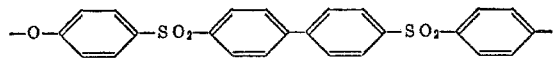

EXAMPLE 2

4-chlorobenzene sulphonyl chloride (422 g., 2.0 moles) was dissolved in nitrobenzene (500 cm.³) and the solution was added dropwise to a warm (ca. 105° C.) solution of p-terphenyl (460 g., 2.0 moles) containing anhydrous ferric chloride (3 g.). When the addition was complete the mixture was stirred for a further 2 hours at this temperature, cooled and poured into methanol (1000 cm.³) which contained a small amount of acetyl acetone (10 cm.³). The precipitate was washed copiously with methanol and then dried under vacuum. The yield of product was 566 g. (69%). Recrystallisation from N,N-dimethyl formamide afforded 4-chlorophenylsulphonyl-p-terphenyl as buff coloured crystals, M.P. 268–271°. The elemental analysis, and the infra-red and nuclear magnetic resonance spectra were consistent with the structure

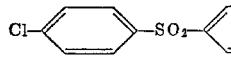

A mixture of 4-chlorophenylsulphonyl-p-terphenyl (202 g.; 0.5 mole) and 4-fluorobenzenesulphonyl chloride (97 g., 0.5 mole) was dissolved in nitrobenzene (500 cm.³) and anhydrous ferric chloride (8 g.) added. The mixture was heated to 150° C. until the evolution of hydrogen chloride ceased whereupon the precipitate which formed was filtered off and washed with a mixture of methanol (500 cm.³) and acetyl acetone (10 cm.³) and finally with methanol. The yield of product was 210 g. (75%). Recrystallisation from dimethyl sulphoxide afforded 4-(4-chlorophenylsulphonyl) - 4' - (4 - fluorophenylsulphonyl)-p-terphenyl of M.P. 344–345° C. The elemental analysis and the infra-red and nuclear magnetic resonance spectra were consistent with the structure

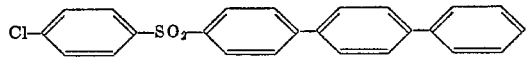

This compound could be polymerized by the method described in Example 1 to give a polymer having repeat units of the structure

EXAMPLE 3

To a stirred solution of 4-chlorophenylsulphonyl-biphenyl prepared as described in Example 1 (66 g.; 0.2 mole) in dichloromethane (200 cm.³) was added dropwise a solution of chlorosulphonic acid (13.2 cm.³; 0.2 mole) in dichloromethane (100 cm.³). After complete addition, the mixture was heated under reflux for 30 mins. whereupon a pale pink precipitate formed. This precipitate was washed with dichloromethane and dried under vacuum to give 4-(4-chlorophenylsulphonyl)biphenyl-4'-sulphonic acid. The yield was 67 g. (81%) of a product of M.P. 238–240° C. Titration of acid end groups with potassium hydroxide gave an equivalent weight which suggested the presence of the monohydrate; the infra-red and nuclear magnetic resonance spectra were consistent with the structure

A mixture of 4-(4-chlorophenylsulphonyl)biphenyl-4'-sulphonic acid (14 g.; 0.03 mole) and 4-fluorophenyl-sulphonyl-biphenyl (10 g.; 0.03 mole) was heated under an atmosphere of nitrogen in the melt at 260° C. for 13 hours. Upon cooling to room temperature a glass-like solid formed which was recrystallised from N,N-dimethyl formamide to give a product which melted over the range 310–320° C. The infra-red and nuclear magnetic resonance spectra were consistent with the structure

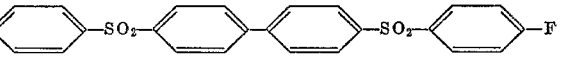

namely 4 - (4' - 4'' - chlorophenylsulphonylbiphenylyl) sulphonyl-4'-(4-fluorophenylsulphonyl)biphenyl.

This compound could be polymerised by the method described in Example 1 to give a polymer having repeat units of the structure

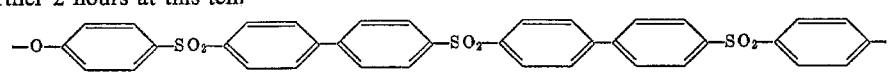

We claim:
1. A polymerizable compound of the formula

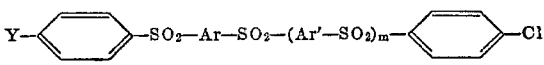

in which
Y is fluorine or hydroxy;
m is zero or one;
Ar and Ar' are bivalent aromatic radicals such that the compounds H—Ar—H and H—Ar'—H contain two hydrogen atoms that are capable of replacement by reaction with an aromatic sulphonyl chloride under Friedel-Crafts conditions in two distinct stages; and
when Y is hydroxy the alkali metal salts thereof, Ar and Ar' being selected from the group consisting of

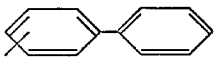

and

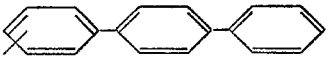

2. A compound as claimed in claim 1 wherein m is zero.
3. 4-(4-chlorophenylsulphonyl) - 4' - (4-fluorophenylsulphonyl)biphenyl.
4. 4-(4 - chlorophenylsulphonyl)-4'-(4-hydroxyphenylsulphonyl)biphenyl.
5. The potassium salt of the compound claimed in claim 4.
6. 4-(4-chlorophenylsulphonyl) - 4' - (4-fluorophenylsulphonyl)-p-terphenyl.
7. 4 - (4' - 4'' - chlorophenylsulphonylbiphenyl)sulphonyl-4'-(4-fluorophenylsulphonyl)biphenyl.

References Cited

UNITED STATES PATENTS 3,355,272  11/1967  D'Alessandro ____ 260—607 A X
3,321,449   5/1967  Vogel _____ 260—607 A X

FOREIGN PATENTS 1,153,035  5/1969  England _____ 260—607 A
1,016,245  1/1966  England _____ 260—607 A LEWIS GOTTS, Primary Examiner
D. R. PHILLIPS, Assistant Examiner U.S. Cl. X.R.

260—79.3 M, 331.5, 327 P, 340.3, 329.3, 346.2 M, 576, 606.5 P